United States Patent
Mathew et al.

(10) Patent No.: US 12,271,763 B2
(45) Date of Patent: Apr. 8, 2025

(54) INTELLIGENT LOAD BALANCING IN A DISTRIBUTED SYSTEM

(71) Applicant: Dell Products L.P., Round Rock, TX (US)

(72) Inventors: George Mathew, Belmont, CA (US); Mukesh K. Sharma, Wakad Pune (IN); Murthy V. Mamidi, Queen Creek, AZ (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 17/727,505

(22) Filed: Apr. 22, 2022

(65) Prior Publication Data

US 2023/0342222 A1    Oct. 26, 2023

(51) Int. Cl.
| | |
|---|---|
| G06F 16/00 | (2019.01) |
| G06F 9/50 | (2006.01) |
| G06F 16/13 | (2019.01) |
| G06F 16/176 | (2019.01) |
| G06F 16/182 | (2019.01) |

(52) U.S. Cl.
CPC .......... G06F 9/5083 (2013.01); G06F 16/137 (2019.01); G06F 16/1774 (2019.01); G06F 16/182 (2019.01)

(58) Field of Classification Search
CPC .. G06F 9/5083; G06F 16/182; G06F 16/1774; G06F 16/137
See application file for complete search history.

(56) References Cited

U.S. PATENT DOCUMENTS

| | | | | |
|---|---|---|---|---|
| 5,628,005 | A * | 5/1997 | Hurvig | G06F 16/10 710/200 |
| 2009/0006500 | A1* | 1/2009 | Shiozawa | G06F 11/2097 |
| 2016/0269480 | A1* | 9/2016 | Hsieh | G06F 9/542 |
| 2016/0283274 | A1* | 9/2016 | Kochunni | G06F 9/4881 |
| 2016/0352813 | A1* | 12/2016 | Johnson | G06F 11/2048 |
| 2017/0286707 | A1* | 10/2017 | Eda | G06F 21/6218 |
| 2018/0157860 | A1* | 6/2018 | Nair | G06F 21/6218 |
| 2019/0166019 | A1* | 5/2019 | Jagadeesh | H04L 41/5054 |

* cited by examiner

*Primary Examiner* — Alex Gofman
*Assistant Examiner* — Suman Rajaputra
(74) *Attorney, Agent, or Firm* — Staniford Tomita LLP (57) ABSTRACT

Embodiments for performing load balancing in a filesystem of a distributed network comprising worker nodes accessing shared resources that are controlled by distributed locks to grant and prevent access from clients, by assigning a range of directory entries to each worker node, and providing feedback from each worker node to a load balancer to expose an internal state of acquired resources and other parameters of each worker node. In response to periodic updates of the directory ranges to be collocated, the system maintains directory ranges in each worker so that complete subtrees of the directory tree fit in a single range assigned to a worker. Upon receipt of a client request to access a data asset, the load balancer selects the most optimum worker to satisfy the request based on the worker internal states and other parameters.

19 Claims, 5 Drawing Sheets

INTELLIGENT LOAD BALANCING IN A DISTRIBUTED SYSTEM

TECHNICAL FIELD

Embodiments are generally directed to distributed networks, and specifically to balancing load in a scalable system using directory information of worker nodes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The enormous and continuous growth of data has led to increasing use of distributed file systems deployed in clustered network systems. A distributed file system is a type of file system in which data may be spread across multiple storage devices. The distributed file system can present a global namespace to clients in a cluster accessing the data so that files appear to be in the same central location. Distributed file systems are typically very large and may contain many hundreds of thousands or even many millions of files.

Clustered network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software.

To distribute large workloads among numbers of distributed machines, load balancers are used to ensure that each worker provides an appropriate amount of resources in the overall system. Load balancers often use techniques like round-robin distribution or consider processor and/or memory load on workers to decide next worker for an incoming request. These load balancing techniques are inefficient for performance sensitive applications like accessing data in a distributed filesystem.

What is needed, therefore, is a load balancing mechanism for distributed file systems that uses specific information about nodes and workers to more efficiently balance workloads among nodes in a scalable network.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a system and method that can perform load balancing in a distributed or cluster-based scalable network. The load balancer works at the directory level and incorporates a feedback loop from worker nodes back to the load balancer so that it is aware of internal states of the workers.

Figure 1:
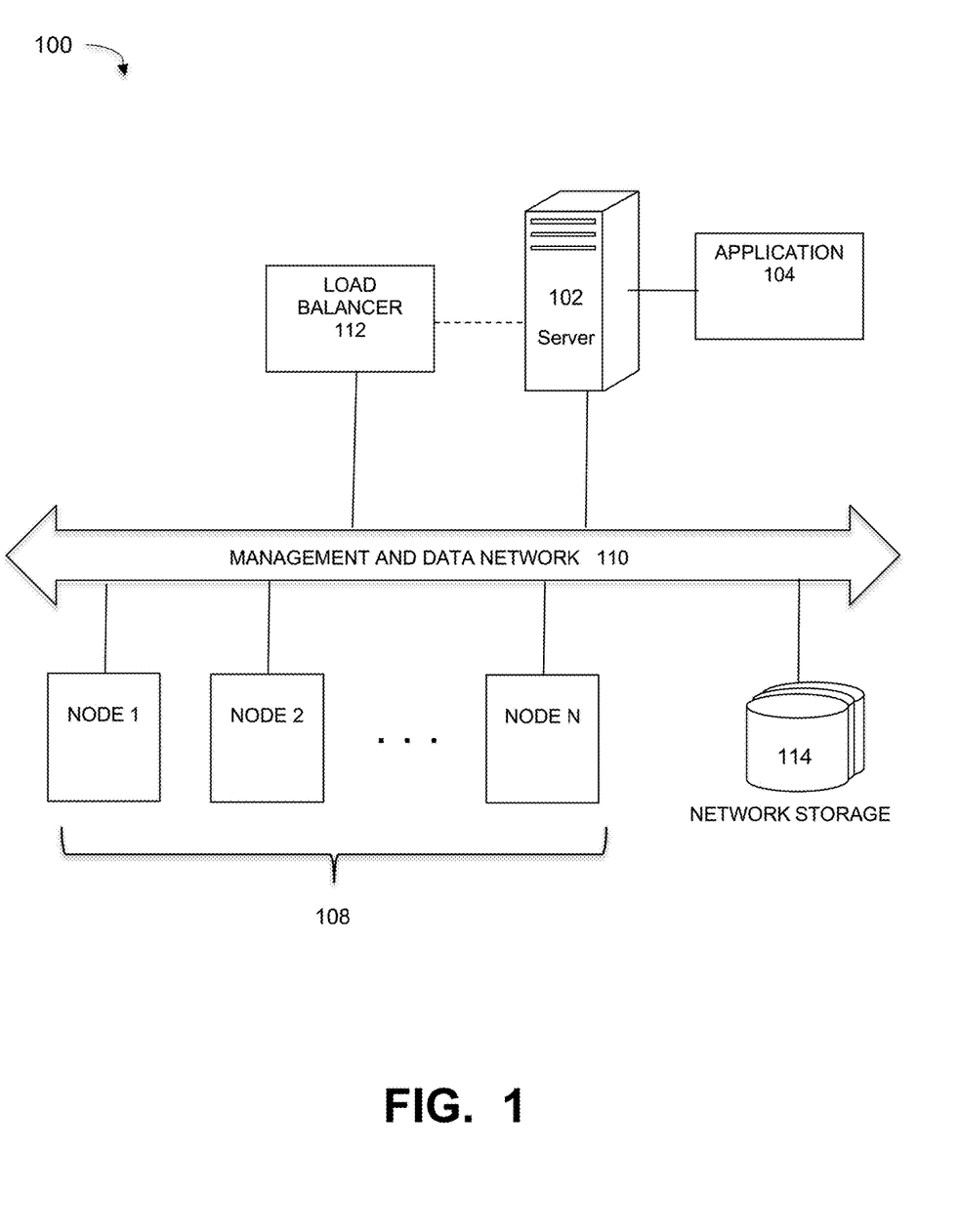
FIG. 1 is a block diagram of illustrating a distributed system implementing directory-based load balancing, under some embodiments.

FIG. 1 is a block diagram of illustrating a distributed system implementing an intelligent directory-level load balancer, under some embodiments. System 100 comprises a large-scale network that includes a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and server 102 through network 110. Theses client compute nodes may include installed agents or other resources to process the data of application 104. The application at the server 102 communicates with the nodes via the control path of network 110 and coordinates with certain agent processes at each of the nodes 108 to perform application functions of the distributed file system.

The network 110 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform.

For the example network environment 100 of FIG. 1, server 102 is an application server that executes one or more applications or processes 104 that processes data in the system using one or more nodes 108. One typical application is a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components.

System 100 represents a scalable network in that capacity can be increased or decreased by adding or deleting nodes as application needs change. The nodes 108 typically have the same relative resource capacity, and so adding or decreasing system resources involves adding new nodes (up-scaling) or deleting existing nodes (down-scaling) to tailor the system scale to the appropriate level.

Besides having the appropriate number of nodes in the system, work should be evenly distributed among the nodes so that nodes are not overloaded with other nodes being under-utilized. The load balancer process 112 operates to spread work among the worker nodes to optimize performance of the network as a whole.

In a typical scalable system, a load balancer assigns incoming requests to the workers. These workers might be in the form of services, containers, virtual machines, physical machines, or anything similar to allow an independent scaling. The performance of data-centric scalable systems depends heavily on which worker is handling a particular request because each worker may take a different amount time for the same operation. The time taken by a worker depends on its physical placement, closeness with the needed backend service, state of acquired resources (e.g., shared locks), and many other factors that are not always visible to the load balancer.

Figure 2:
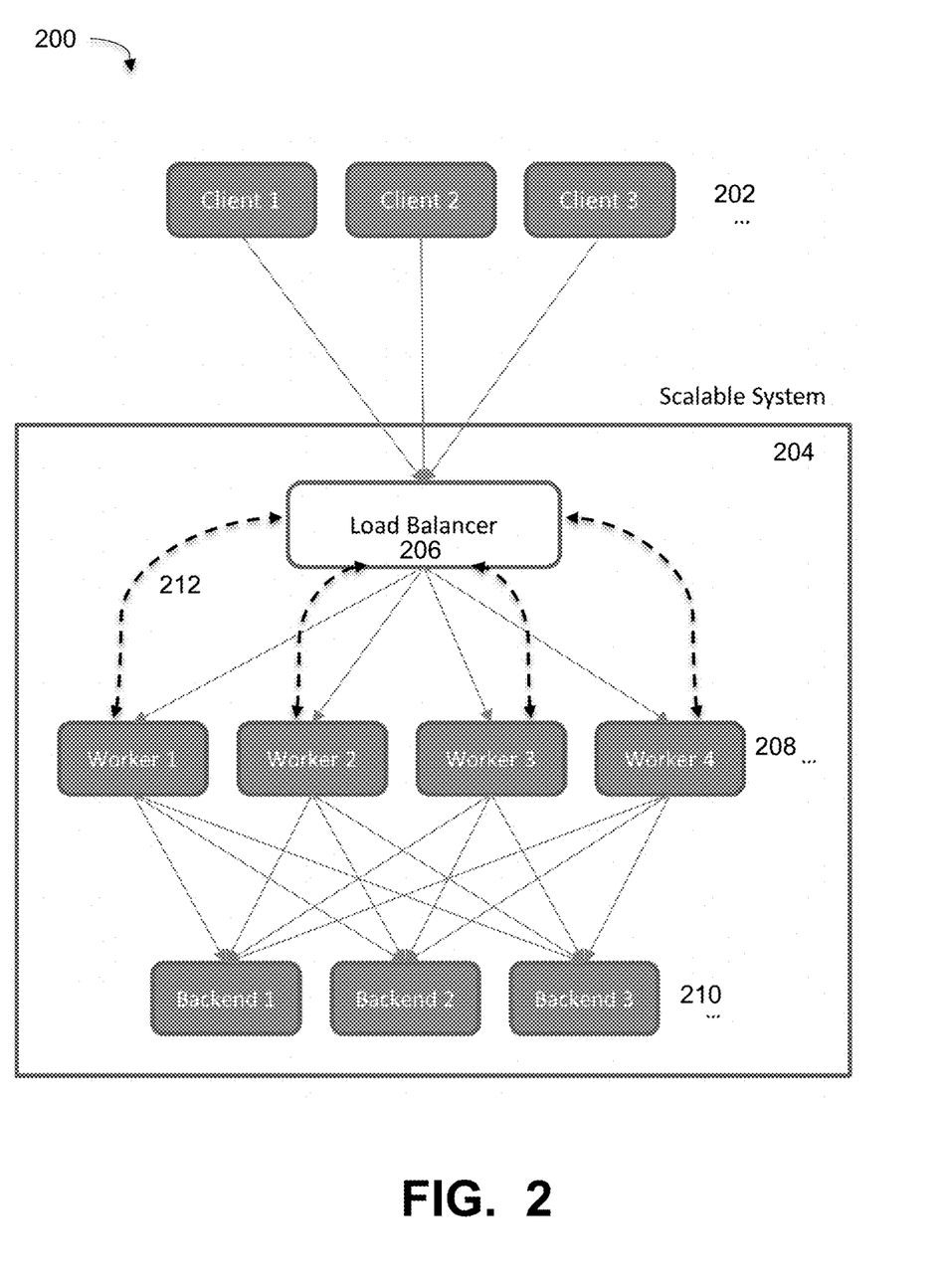
FIG. 2 illustrates a scalable system with an intelligent load balancer, under some embodiments.

FIG. 2 illustrates a scalable system with an intelligent load balancer, under some embodiments. As shown in FIG. 2, system 200 comprises a number of clients 202 coupled to a load balancer 206 within the scalable system 204. The load balancer 206 redirects the workloads from the clients to one of several worker nodes 208, which serve appropriate back-end components 210. This architecture allows the system to scale (add/delete workers) while the load balancer provides a level of abstraction to the clients 202.

As stated above, the load balancer 206 assigns incoming requests to the workers 208, and system performance depends greatly on which worker is handling a particular request. The embodiment of system 200 adds feedback loops 212 from each of the workers back to the load. This enables the load balancer to be aware of and take into account certain internal states and processes of the workers when making load balancing decisions. Such internal knowledge can include the state of acquired resources, the closeness of a worker with a backend service, and other similar factors.

Embodiments of the intelligent load balancer system 200 can be used in any application that involves clients accessing shared resources in the system. Such resources can be data, software processes, API calls, hardware resources (e.g., printers, displays, etc.), or any other shared resource. In a cluster or distributed network, this usually involves concurrent or near-concurrent requests from clients to the same resource. In order to avoid contention among clients accessing these resources, systems often use locks to lockout a client request while another client's request is served. This locking mechanism thus involves a client acquiring the lock, accessing/using the resource, and then releasing the lock when finished. While the lock is asserted, no other client can access that resource and must wait until it acquires the lock. In a highly active distributed network with several clients accessing common resources, requests may bounce back and forth among two or more different clients, thus leading to a lock 'ping-pong' effect, which can create significant inefficiency in the system.

In an embodiment, the load balancer system 200 is used in a filesystem environment that comprises a number of clients accessing files stored in a namespace. The resources thus comprise data assets such as documents, files, images, or any other data element that is stored in storage media of the system. These data assets are typically organized into a hierarchical directory structure using Merkle tree structures.

With respect to a certain example embodiment, the DellEMC Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

A DDFS system forms segments from data, and these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of lame data structures. A fingerprint is thus a compact representation of the actual data (or segment). The data (or segment) is passed through a SHA-1 (Secure Hash Function) cryptographic hash function. Each unique data segment will generate a unique fingerprint, which is used to index and get the actual data segment.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 3:
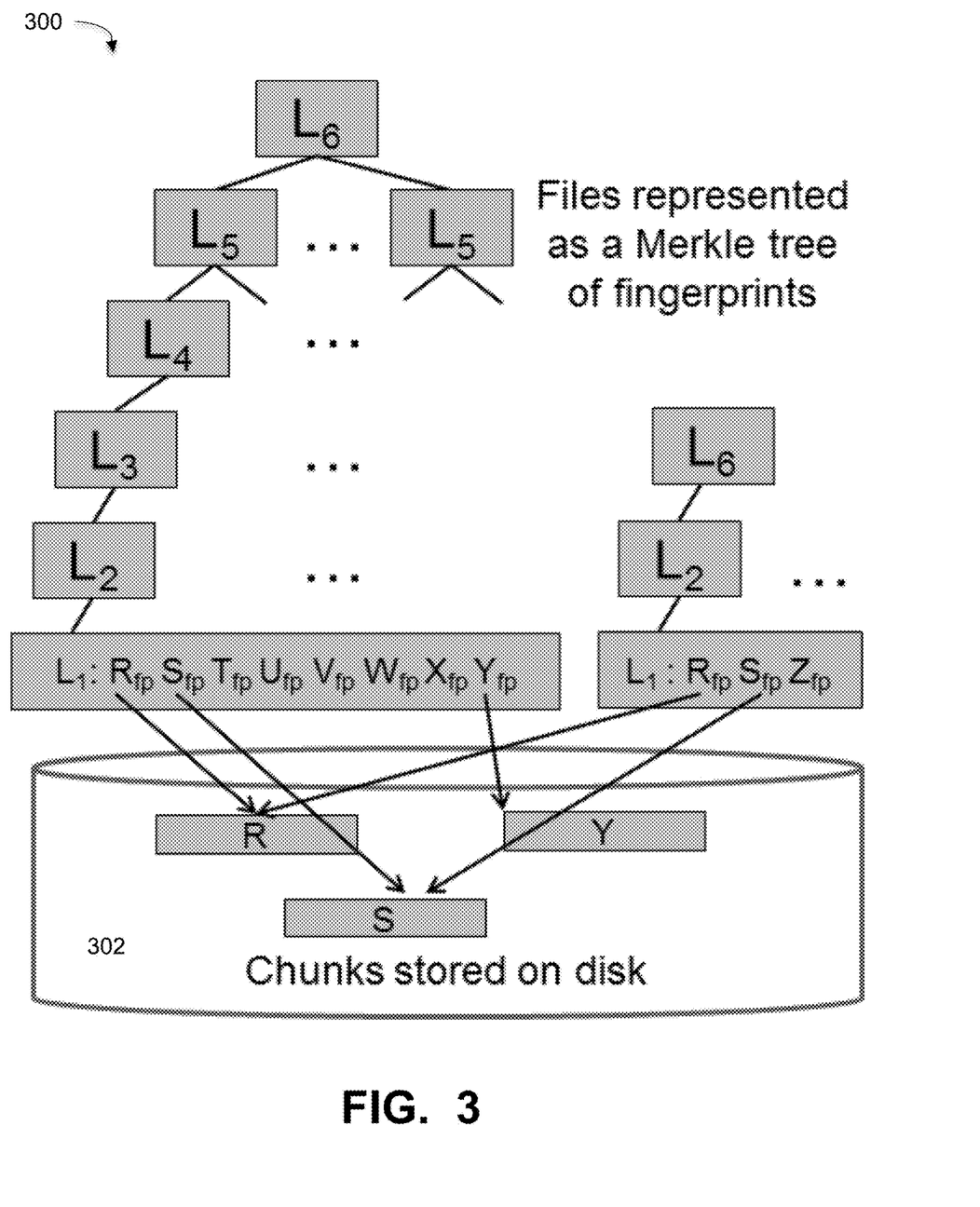
FIG. 3 illustrates files an example Merkle tree representation of files in a deduplication backup system, under some embodiments.

FIG. 3 illustrates files an example Merkle tree representation of files in a deduplication backup system, under some embodiments. As shown in FIG. 3, Merkle tree 300 comprises layers L0 to L6. The chunks directly written to disk 302 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

Typically, distributed file systems use a B+ Tree of a system buffer cache to store directory entries, such as in systems comprising a Veritas cluster filesystem, IBM GPFS, Santorini Distributed file system, or other similar filesystems. The pages of the B+ Tree or the buffer cache for the directory blocks are kept coherent using a set of cluster-wide distributed locks. Every time metadata is read or modified by a node, it has to flush and invalidate the cached copy of metadata in any other node. A load balancer that distributes the operations in a round-robin way would incur a penalty because of the repeated request-release cycles (ping pong) of these distributed locks.

The use of distributed locks is important in cluster networks. As stated previously, locking prevents a node from processing a data asset and/or using a system resource, and properly distributing a lock is necessary to ensure that only one out of several possible nodes perform work on an asset at any one time, for example to perform a computation, write data to a shared storage system, call an external API, and so on. Locks are used to maintain correctness and ensure efficiency. Taking a lock prevents the system from unnecessarily doing the same work twice, in that if a lock fails and two nodes do the same work, repetitive functions are performed, which is inefficient. More importantly, taking a lock prevents concurrent processes from interfering or corrupting one another, which can lead to data loss, corruption, inconsistency, and so on. During normal operation, a distributed lock is acquired by a client that then reads the data, performs its process and writes the data back and then releases the lock. For example, if a client needs to update a file, it first acquires the lock, reads the file from storage, makes changes, writes the file back to storage, and then releases the lock. This lock prevents another client from performing this read-modify-write cycle at the same time on the same file.

The load balancer system 200 distributes large workloads among numbers of distributed machines in a way that ensures that each worker provides an appropriate amount of resources in the overall system. Unlike present load balancers that use techniques like round-robin distribution or consider processor and/or memory load on workers to select the next worker for an incoming request, load balancer 206 examines the internal state of the workers to make an informed selection decision to achieve a performance gain for the system as a whole. This might constitute a tight-coupling and loss of modularity between load balancer and workers, but it provides a significant improvement in performance sensitive applications where it matters which worker performs a given operation.

In an embodiment, the load balancer system assigns ranges of directories to each worker. Through their respective feedback circuits 212, each worker 210 periodically publishes its internal information to the load balancer 206. The load balancer looks at incoming requests from clients 202 and picks the best worker for the job. Since the load balancer also knows internal state of the workers, it can select the appropriate worker for a given range of the directories assigned to each worker.

FIG. 2 illustrates a load balancer for a scalable system with a feedback circuit 212, under some embodiments. Using the feedback circuit of FIG. 2, the file system periodically updates the ranges of directories that needs to be collocated. For example, if a file system has directory inodes from 16 to 4000 and has four worker nodes, this information could be as simple as giving a range to the load balancer of: <16-1000; 1001-2000; 2001-3000; 3001-4000>. The load balancer could use this information to ensure that each range is assigned to a single worker node. The filesystem can determine the ranges so that a complete subtree of the B+tree fits in one of the range. This ensures that the B+tree pages are not revoked normally.

In an embodiment, the clients 202 access data assets, such as files, documents, and so on, that are stored in a namespace of the filesystem. In a Data Domain Filesystem (DDFS) or similar filesystem, namespace keys are ordered using a directory_inode:child_inode key, format, with the directory Inode being the primary key and the child inode being a secondary key. All children of a given directory will be placed nearly in the B+tree as they have the same directory key.

There are generally two kinds of namespace operations that are performed in system 200. The first type are operations that change a namespace, such as create, delete, or rename files. These operations have a directory Inode and an associated file inode. The second type are operations that alter an Inode image, such as a set attribute (setattr). These operations work mostly on an individual Inode. With respect to this second type of operation, the load balancer system 200 addresses this issue by moving Inodes to a different key-value (KV) store.

The load balancer system 200 is configured such that all namespace operations in the first type of operation above will use the directory Inode to distribute the calls from load balancer 206 to the workers 208. The process takes the range of directory inodes, and associates portions of the range to different workers. For example, if the directory Inode range is from 1-1000 and there are four workers, the worker-range assignments can be as follows:

Worker 1: Directories 1 to 250
Worker 2: Directories 251 to 500
Worker 3: Directories 501 to 750
Worker 4: Directories 751 to 1000.

The purpose of this type of distribution among the workers is to make sure that B+tree page ownership remains consistent with a single worker.

In this case, since the B+tree keys are ordered using directory_inode:file_inode, the fact that all directory operations for directory 1-250 goes to the same worker, this will result in minimal B+tree page lock ping-pong effect across the workers.

Keys are arranged in the B+tree pages in the order of parent directory inodes. For example, in the above case, the initial B+tree pages will hold entries for directories 1-250, the next set of pages for 251-500, and so on. The load balancing system ensures that the directory operations are sent to workers in an order that minimizes the page lock ping-pong effect.

In an embodiment, the information shared by the workers 208 back to the load balancer can over the feedback loops 212, can be expressed as:

```
struct dm_page_info {
    int first_inode;
    int last_inode;
}
struct directory_ranges {
    array [ ] dm_page_info;
}
```

For example, if there are 10 B+tree pages, their first and last directory inode information is shared with the load balancer so that it can distribute these pages evenly across the workers.

A sample information payload can be expressed as:

```
struct directory_ranges {
    [
        {1, 100},
        {102, 360},
        {361, 400},
        {405, 1020},
        {1021, 10000},
        {10010, 10020},
        {10024, 100005},
        {100009, 2000050},
        {2000050, 2050020},
        {2050050, 8111234}
    ]
}
```

This information indicates that the first B+tree page contains directory nodes from 1 to 100, second page contains directory inodes from 102 to 360, and so on. This is just an example, and number of pages and directory inode numbers will vary based on the data stored in the filesystem.

Figure 4:
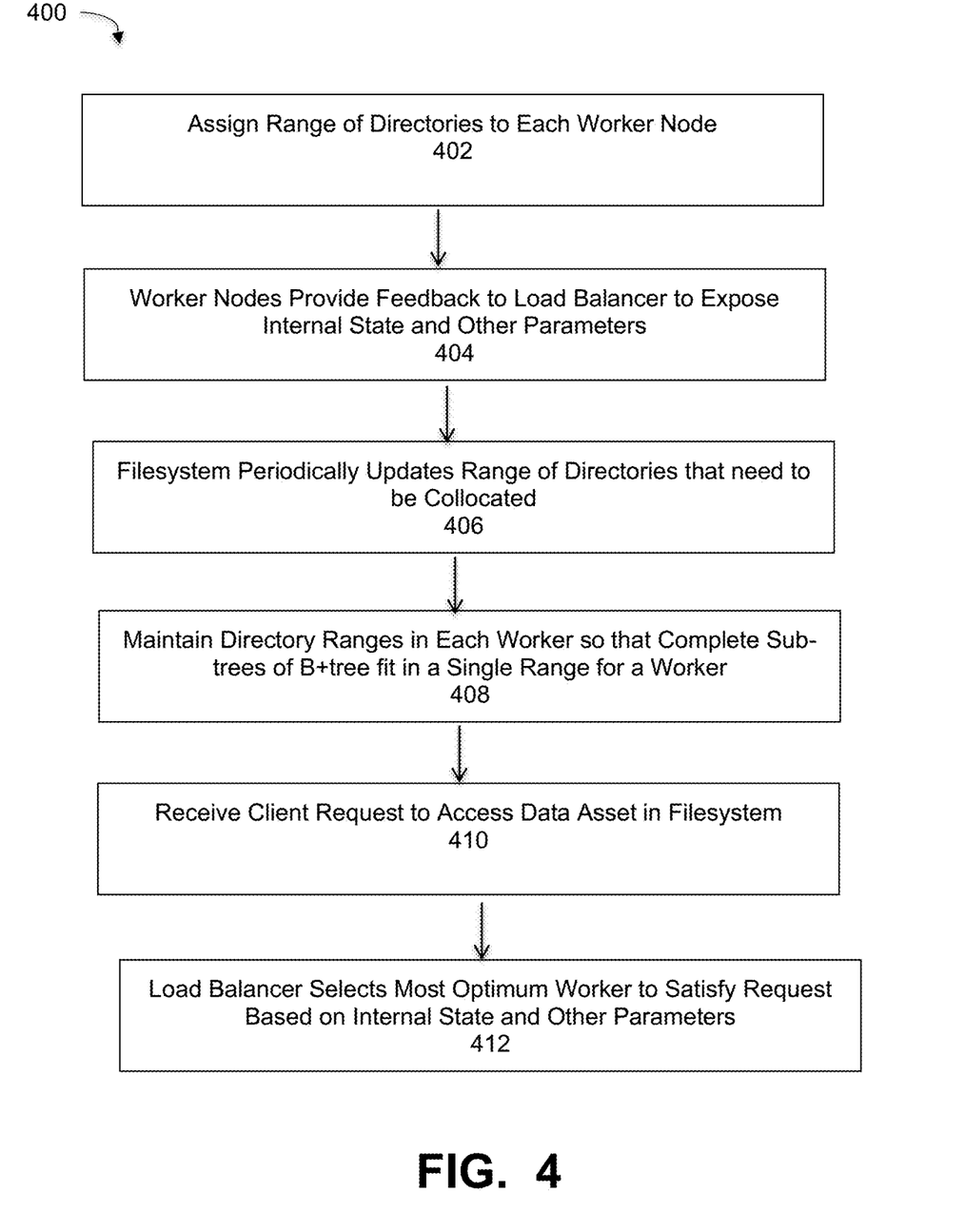
FIG. 4 is a flowchart of an intelligent load balancer process for distributed systems, under some embodiments.

FIG. 4 is a flowchart that illustrates an overall method of performing intelligent load balancing in a distributed system, under some embodiments. Process 400 of FIG. 4 performs load balancing in a filesystem of a distributed network comprising worker nodes accessing shared resources that are controlled by distributed locks to grant and prevent access from clients. The process starts by assigning a range of directory entries to each worker node, such as described in the example above, 402. Each worker node provides feedback to the load balancer to expose an internal state of acquired resources and other parameters of each worker node, such as closeness of backend services, amount of free resources in the worker node, locality of directories, and so on, 404.

During normal operation, the filesystem may periodically update the range of directories that need to be collocated, 406. In response to these periodic updates, the system maintains directory ranges in each worker so that complete subtrees of the directory tree fit in a single range assigned to a worker, 408. Upon receipt of a client request to access a data asset, 410, the load balancer selects the most optimum worker to satisfy the request based on the worker internal states and other parameters, 412.

In an embodiment, the load balancer uses a Consistent Hashing algorithm to distribute these ranges to the available workers. This algorithm distributes the resources (directories) across the worker nodes of the network using a Consistent Hashing Ring process. When the number of workers change (i.e., through addition/deletion), the load balancer will also ensure to redistribute the ranges, but in a manner that minimizes the impact. For example, if there are four workers, a distribution may look like:

Worker 1: range 1, 2 and 3
Worker 2: range 4, 5 and 6
Worker 3: range 7 and 8
Worker 4: range 9 and 10

Consistent hashing is a distributed hashing technique that operates independently of the number of servers or objects in a distributed hash table by assigning them a position on a hash ring. In consistent hashing, when a hash table is resized, only n/m keys need to be remapped on average where n is the number of ranges and in is the number of workers. In contrast, in most traditional hash tables, a change in the number of workers causes nearly all keys to be remapped because the mapping between the ranges and the workers is defined by a modular operation. Consistent hashing, on the other hand, is particularly useful in the example embodiment where an addition of a worker requires only On items to be re-shuffled.

It should be noted that although consistent hashing is used to apply directory range information, embodiments are not so limited, and other similar methods may be used.

The load balancer system 200 exposes the internals of workers 208 to the load balancer 206 and this information is used to optimize system performance by selecting the best worker for a particular incoming request. Information can be shared between the load balancer 206 and the workers 208 using one of a push model or pull model.

In the push model, one of the workers picks one of the load balancer instances and calls an API for it. Picking up which worker will do this job is a challenge. Workers can control the frequency of feedback, such as they may inform the load balancer only after a significant change. This results in a degree of loss of modularity, as workers do not generally know anything about the load balancer even in this case where they do need to know.

In the pull model, the load balancer periodically calls an API exposed by a worker and gets the information. This might be a fixed interval (e.g., every hour). In this implementation, the rate of change may be too high, or too low, compared to this polling frequency, and may not always return best results. If rate of change is too low, the API might be a wasted effort, and if the rate of change of directory inode information is too high, the distribution among the workers may not be optimal until the information on load balancer side is refreshed. The pull model can be considered a modular design, and the load balancer is always aware about the workers. Either the push or pull model can be used depending on system configuration and user preference.

Embodiments have been described with respect to distributed lock management for shared resources, but embodiments are not so limited. The intelligent load balancer can be used for other applications, such as improvement of cache performance when nodes go bad. Every time metadata is read or modified by a worker node, it has to flush and invalidate the cached copy of metadata in all other worker nodes. A typical load balancer that distributes the operations in a round robin way would incur a penalty because of repeated invalidating of cached copies of previous worker nodes for a particular directory inode. Using the load balancer system 200, since load balancer 206 always sends operations for a particular directory inode to the same worker node, it allows workers to keep cached copies for subsequent performance improvements. Subsequent calls coming to same worker node avoid the need to invalidate cached copies in other worker nodes until there is some change in number of workers. Even when a worker node goes bad, the number of directory inodes which get rebalanced are minimal. That is, only those inodes that were owned by failed worker node get re-balanced, and only for those does cache invalidation need to be done. In contrast, previous load balancers require many directory inode mappings could be changed in case of a change in workers, requiring cache invalidation for all of these directory inodes.

Embodiments of the intelligent load balancer system improve on traditional load balancers by examining the internal state of the workers and making an informed decision to achieve a performance gain. Though this might constitute a tight-coupling and loss of modularity between load balancer and workers, it does provide a significant improvement in performance sensitive applications where it matters which worker performs a given operation. If there are any shared resources in the system, this approach also solves the problem of back-and-forth reservation ping-pongs for those resources. Such a scalable system can be implemented as a cloud-based system or as an in-premise system.

Although embodiments are described with respect to data accesses in a B+tree name space, any shared resource application can be used. For example, if there is an exclusive printer required for some operations, the load balancer 206 can determine which worker is currently holding reservation for the printer, and can redirect all printer related operations to that worker. Using previous load balancers and distribution algorithms, this process would have seen printer reservation ping-pongs among various workers, making the system inefficient.

This feedback mechanism 212 provides a load balancer system that uses specific knowledge about the range of directories utilized by the workers. In this embodiment, an incoming request is assigned to such a worker so that processing overhead is minimized. The selection of particular workers can be optimized to look for the amount of free resources available in the worker node.

Figure 5:
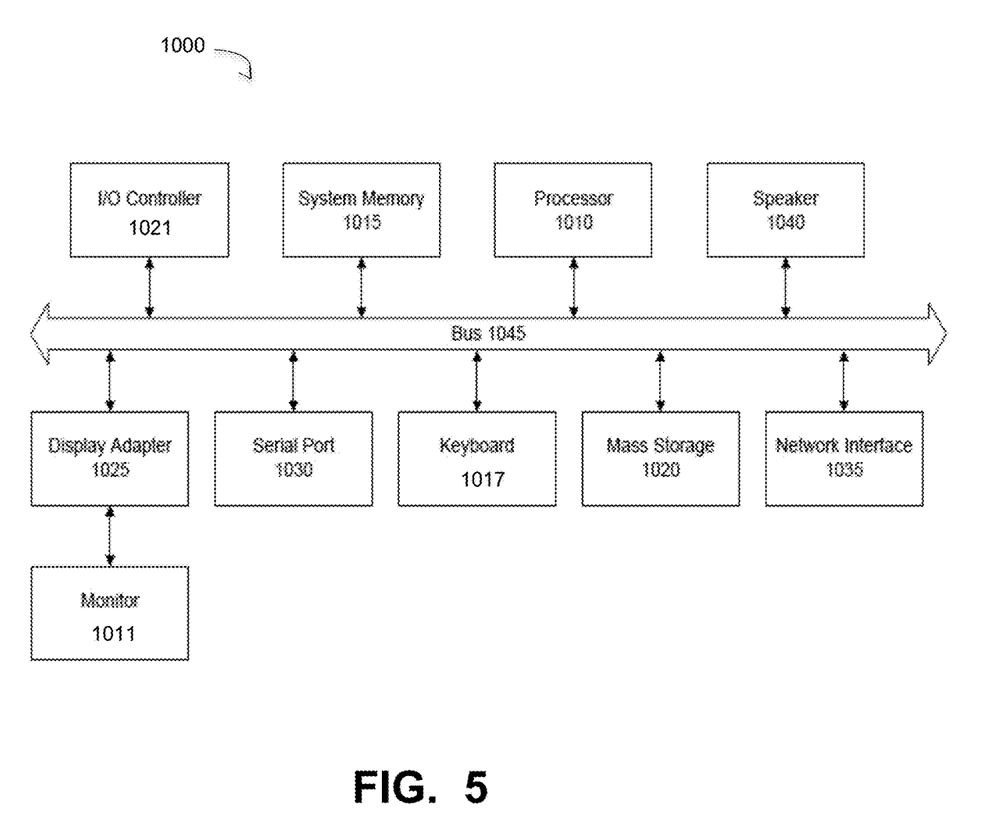
FIG. 5 is a block diagram of a computer system used to execute one or more software components of an intelligent load balancer process in a distributed system, under some embodiments.

FIG. 5 is a block diagram of a computer system used to execute one or more software components of an intelligent load balancer process for distributed systems, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of performing load balancing in a filesystem of a distributed network, comprising:

identifying hardware-based worker nodes accessing shared resources of a deduplication backup system that are controlled by distributed locks to grant and prevent access from clients of the filesystem;

utilizing a namespace of the filesystem using a directory inode: child inode key format, wherein the directory inode is a primary key and the child inode is a secondary key, and wherein all children of a directory are placed in a directory tree corresponding to their directory key;

providing, over network links, feedback from each worker node to a processor-based load balancer to expose an internal state of acquired resources and physical placement in terms of closeness of the worker node to a backend service, and state of shared locks of the distributed locks of each worker node, as each worker node performs a data backup operation of the deduplication backup system;

using the feedback to periodically update a range of directories that need to be collocated to ensure that each range of directory entries is assigned to a single worker node;

organizing the range of directories so that a complete subtree of the directory tree fits in a single range to minimize any page lock effect resulting from requests bouncing among different clients;

maintaining, in response to periodic updates of the directory ranges to be collocated, directory ranges in each worker so that complete subtrees of a directory tree fit in a single range assigned to a single worker node;

selecting, by the load balancer and upon receipt of a client request to operate on a data asset, a worker node that satisfies the request based on the worker node internal states and other parameters by assigning to the selected node one or more subtrees that minimize directory lock and unlock by the distributed locks among the worker nodes so as to achieve a performance gain for the deduplication backup system using the acquired resources; and balancing, by the load balancer, data processing operations on the data asset by the backup operation performed by the deduplication backup system to optimize usage of the shared resources of the distributed network and performance of the distributed network as a whole.

2. The method of claim 1 further comprising distributing the range of directory entries to the worker nodes using a Consistent Hash Ring process.

3. The method of claim 2 wherein the Consistent Hash Ring process resizes a hash table for the worker nodes through a remapping of only a fractional value based on the number of worker nodes and directory ranges.

4. The method of claim 3 wherein the Consistent Hashing Ring process redistributes directory ranges among the worker nodes when worker nodes are added or deleted from the system in a manner that minimizes an impact of such a change.

5. The method of claim 1 wherein a distributed lock is used by a client to lock a data asset or process executable by the network to prevent contention with another client.

6. The method of claim 1 wherein the feedback provides information about a respective worker node back to the load balancer using one of a push model or pull model.

7. The method of claim 6 wherein the push model comprises selecting a worker node to pick one instance of the load balancer, and selecting a frequency of feedback to provide the information.

8. The method of claim 6 wherein the pull model comprises periodically calling, from the load balancer, an application program interface (API) exposed by a worker node and to get the information from the worker node.

9. A system for performing load balancing in a filesystem of a distributed network, comprising:

a plurality of hardware-based worker nodes accessing shared resources of a deduplication backup system that are controlled by distributed locks to grant and prevent access from clients of the filesystem;

a namespace of the filesystem using a directory inode: child inode key format, wherein the directory inode is a primary key and the child inode is a secondary key, and wherein all children of a directory are placed in a directory tree corresponding to their directory key;

a network feedback circuit sending information from each worker node to a processor-based load balancer to expose an internal state of acquired resources and other parameters of each worker node, as each worker node performs a data backup operation of the deduplication backup system;

a first processor-based component assigning the feedback to periodically update a range of directories that need to be collocated to ensure that each range of directory entries is assigned to a single worker node, and organizing the range of directories so that a complete subtree of the directory tree fits in a single range to minimize any page lock effect resulting from requests bouncing among different clients;

an interface receiving periodic updates of the directory ranges to be collocated, wherein the load balancer maintains, in response to the updates, directory ranges in each worker node so that complete subtrees of a directory tree fit in a single range assigned to a single worker node, and selects, upon receipt of a client request to operate on a data asset, a worker node that satisfies the request based on the worker node internal states and physical placement in terms of closeness of the worker node to a backend service, and state of shared locks of the distributed locks by assigning to the selected node one or more subtrees that minimize directory lock and unlock by the distributed locks among the worker nodes so as to achieve a performance gain for the deduplication backup system using the acquired resources; and the load balancer balancing data processing operations on the data asset by the backup operation performed by the deduplication backup system to optimize usage of the shared resources of the distributed network.

10. The system of claim 9 wherein the client request comprises a namespace operation of a first type that changes the namespace or a second type that alter a network node image.

11. The system of claim 9 further comprising a Consistent Hash Ring processing component distributing the range of directory entries to the worker nodes, wherein the Consistent Hash Ring processing component resizes a hash table for the worker nodes through a remapping of only a fractional value based on the number of worker nodes and directory ranges.

12. The system of claim 9 wherein the Consistent Hashing Ring processing component redistributes directory ranges among the worker nodes when worker nodes are added or deleted from the system in a manner that minimizes an impact of such a change.

13. The system of claim 9 wherein a distributed lock is used by a client to lock a data asset or process executable by the network to prevent contention with another client.

14. The system of claim 9 wherein the feedback provides information about a respective worker node back to the load balancer using one of a push model or pull model.

15. The system of claim 14 wherein the push model comprises selecting a worker node to pick one instance of the load balancer, and selecting a frequency of feedback to provide the information.

16. The system of claim 14 wherein the pull model comprises periodically calling, from the load balancer an application program interface (API) exposed by a worker node and to get the information from the worker node.

17. A computer program product, comprising a non-transitory computer-readable medium having a computer-readable program code embodied therein, the computer-readable program code adapted to be executed by one or more processors to implement a method of performing load balancing in a filesystem of a distributed network, comprising:

identifying hardware-based worker nodes accessing shared resources of a deduplication backup system that are controlled by distributed locks to grant and prevent access from clients of the filesystem;

utilizing a namespace of the filesystem using a directory inode: child inode key format, wherein the directory inode is a primary key and the child inode is a secondary key, and wherein all children of a directory are placed in a directory tree corresponding to their directory key;

providing, over network links, feedback from each worker node to a processor-based load balancer to expose an internal state of acquired resources and other parameters of each worker node, as each worker node performs a data backup operation of the deduplication backup system;

using the feedback to periodically update a range of directories that need to be collocated to ensure that each range of directory entries is assigned to a single worker node;

organizing the range of directories so that a complete subtree of the directory tree fits in a single range to minimize any page lock effect resulting from requests bouncing among different clients;

maintaining, in response to periodic updates of the directory ranges to be collocated, directory ranges in each worker so that complete subtrees of a directory tree fit in a single range assigned to a single worker node;

selecting, by the load balancer and upon receipt of a client request to operate on a data asset, a worker node that satisfies the request based on the worker node internal states and physical placement in terms of closeness of the worker node to a backend service, and state of shared locks of the distributed locks by assigning to the selected node one or more subtrees that minimize directory lock and unlock by the distributed locks among the worker nodes so as to achieve a performance gain for the deduplication backup system using the acquired resources; and balancing, by the load balancer, data processing operations on the data asset by the backup operation performed by the deduplication backup system to optimize usage of the shared resources of the distributed network.

18. The computer program product of claim 17 wherein the client request comprises a namespace operation of a first type that changes the namespace or a second type that alter a network node image.

19. The computer program product of claim 18 further comprising distributing the range of directory entries to the worker nodes using a Consistent Hash Ring process, and wherein the Consistent Hash Ring process resizes a hash table for the worker nodes through a remapping of only a fractional value based on the number of worker nodes and directory ranges.

* * * * *